J. PALMER.
Means of Forcing Ashes from Vessels.

No. 143,461.  Patented Oct. 7, 1873.

Witnesses.

Inventor.

UNITED STATES PATENT OFFICE.

JOHN PALMER, OF SANDISFIELD, MASSACHUSETTS.

IMPROVEMENT IN THE MEANS FOR FORCING ASHES FROM VESSELS.

Specification forming part of Letters Patent No. 143,461, dated October 7, 1873; application filed May 26, 1873.

*To all whom it may concern:*

Be it known that I, JOHN PALMER, of Sandisfield, Berkshire county, State of Massachusetts, have invented certain Improvements relating to Ejectors for Ashes and other Refuse from Vessels, of which the following is a specification:

I have, in a patent to me dated September 26, 1865, described an apparatus provided with a funnel near the top for preventing the entrance of too large masses of solid matter. I have, after much experience, arrived at certain important improvements in this part of the structure, by substituting for the funnel a horizontal coarsely-meshed grate or strainer, mounted near the upper end of the apparatus. I provide a cock for letting off the air from the top of the structure, and arrange the lever of the cock so that it is certain to be opened before the screw which holds the cover is relaxed. This makes a try-cock for showing whether the valve below is properly shut before opening the cover. I provide a check-valve, peculiarly arranged, to prevent any ashes from flowing backward into the air-pipe under any circumstances, and I can provide a sluice-valve below this, which may be of great use in case of accident or derangement. Another, and what I esteem one of the most important and novel features in my present improvement is, an efficient provision for the introduction of liberal quantities of water into the apparatus, with the effect of washing out any ashes which might stick upon or in the vicinity of the valve or valves. The water also loosens the ashes when it inclines to clog.

The following is a description of what I consider the best means of carrying out the improvement.

The accompanying drawings form a part of this specification.

Figure 3:
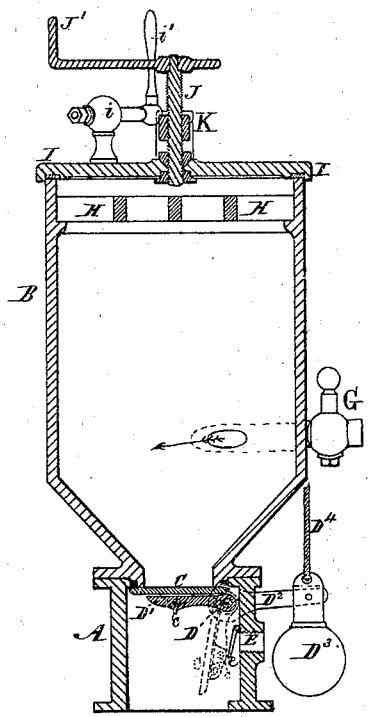
Figure 1:
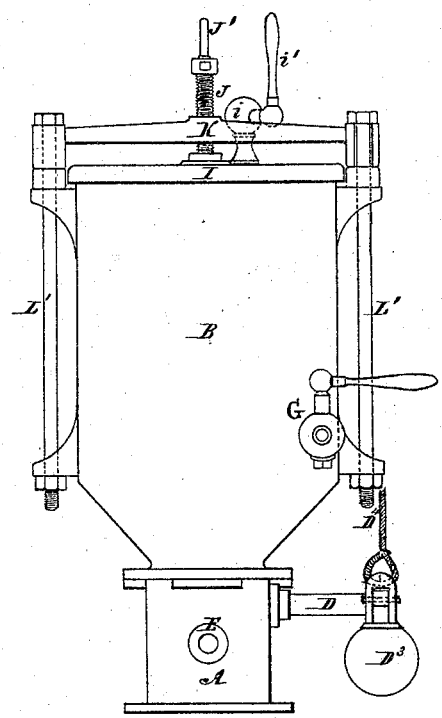
Figure 2:
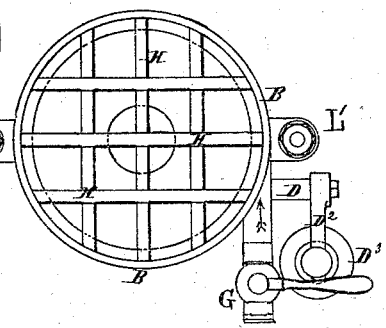

Figure 1 is a side elevation with the cover closed. Fig. 2 is a plan view of the apparatus with the cover swung open to allow the introduction of a charge of ashes. Fig. 3 is a central vertical section at right angles to the view in Fig. 1. This represents the parts in the same closed condition as in Fig. 1.

Similar letters of reference indicate like parts in all the figures.

A is a valve-chest, which is bolted or otherwise fixed to the bottom or shell of the ship, or to a casing, which may contain a sluice-valve, which may be used as additional security. B is an ash receptacle or casing, bolted upon A. C is a valve, properly connected by a slightly-loose joint, $c$, to an arm, $D^1$, keyed on a shaft, D. This shaft extends out through a suitable stuffing-box and carries an arm, $D^2$, weighted, as indicated by $D^3$. The weight $D^3$ is greater than that of the arm $D^1$ and its valve C. A cord or chain, $D^4$, attached to the arm $D^2$ and leading upward, enables the operator to apply his strength to pull the valve open. E is a connection, guarded by a valve, $e$, constructed similarly to the valve C, above described, but smaller, so that it permits fluid to enter through E, but not to return. It is protected from injury by being guarded by the main valve C. Their relative positions, when the valve C is opened, are shown by dotted lines. G is a connection with a pump, (not represented,) which supplies a current of water at will under a strong pressure. This current is directed tangentially into the receptacle B, near its base. H is a coarsely-meshed grating, secured near the top of the ash-receptacle B, with openings smaller than the lower opening or exit. I is a tightly-fitting cover, provided with a rubber facing adapted to match tightly on the top of the receptacle B. It is operated by a screw, J, tapped through the swing-bar K. This bar K turns horizontally on one of the bolts. L is a joint at one end of the bar K. The other end is made to embrace the opposite bolt L', and take a firm hold thereof, when it is swung into position. The screw J is operated by a hand-lever, J'. The cover I is provided with an air-cock, $i$, the handle of which, $i'$, is horizontal when it is open.

To close this cock $i$ the handle $i'$ must be turned into an upright position. In this position it is directly in the way of the turning of the lever or wrench J'. It follows that, whenever the apparatus is to be opened, the operator must, of necessity, turn the lever $i'$ down into the open position, and thus discharge the compressed air within the apparatus before screw J can be turned to liberate the cover I.

Suppose the apparatus to have been recently used for discharging ashes, and the valve C to be wide open, in the position indicated by the dotted lines in Fig. 3. The inflowing air, through the connection E, has filled the entire apparatus with air in such a state of compression as has expelled the water, and allowed the ashes to drop out. In preparing to receive a fresh charge the operator relaxes the cord $D^4$, and the gravity of the weight $D^3$ causes the shaft D to turn and the valve C to shut. If it does not shut right at first, it is again partly opened, and a little water is allowed to enter through the tangential connection G, which, flowing outward through the annular space around the nearly closed valve C, washes away the obstructing matter. A few such movements allows the valve to be cleanly washed of ashes, and to be tightly shut with little or no water above it, but with the receptacle B filled with compressed air. Now, the lever $i'$ of the cock $i$ is turned down, and the compressed air whistles out. When this escape of air ceases it shows distinctly that the valve $e$ is shut. In case it is held a little open by any obstruction the air will continue to blow out through the cock $i$, and will soon be followed by water, in which case the cock $i$ must be closed again, and the valve C must be further worked and washed till it is tightly closed. Next, the screw J is turned, and the cover I ceases to press upon the top of the receptacle B. Next, we swing around the cross-bar K with its attached cover I and cock $i$. This movement exposes the top of the receptacle B to receive a fresh supply of ashes, which may be rapidly shoveled or poured in. Any large solid matter stopping on the grate H must be broken or removed until the pieces drop freely through. Next, the cross-bar K with its attachment is swung back into place, and the cover I again tightly pressed down by operating the screw J. Next, the cock $i$ is shut by turning the handle $i'$ into an upright position.

The apparatus is now ready to be discharged by opening the valve C; but, inasmuch as the pressure in the ash-receptacle B is only that due to the ordinary atmosphere, while the pressure below is considerably greater, it will be difficult to open the valve C. The operator now lets on a current of water, which flows through the connection G, and washes actively around in the bottom of the mass of ashes. As the ash-receptacle becomes partially filled with water, and the air above it becomes compressed, the pressure in the vessel increases, and soon a gentle pull on the cord or chain $D^4$ (which pull may have been maintained constantly from the first opening of the water-passage G, if preferred) causes the shaft D to turn and the valve C to open. The opening of this valve sets the contents of the ash-receptacle at liberty, and it falls more or less freely. The contents—wet and dry—are rapidly transferred by gravity from the receptacle B down into the casing or valve-chest A, and thence out through the skin of the vessel into the ocean, while the compressed air flowing inward past the valve $e$ rises into the top of the apparatus, and takes the place of the ashes previously filling the entire structure. Two or three rapidly-succeeding washes, by brief injections of water through the connection G, may be made to insure the final emptying of the apparatus, and again the valve C is allowed to close, and the operation is repeated.

When a sluice-valve is employed between the valve-chest A and the outside of the ship, I esteem it important that such valve moves in proper grooves to guide it, and that both its front and back edges are beveled so as to better displace any ashes which may accumulate before and behind the valve. In the absence of such precaution, ashes may become tightly lodged in front of it, or behind it, and obstruct its motion. I can move the valve by a shaft having one or more toothed pinions meshing into corresponding racks on the lower or outer surface of the sluice-valve.

There may be provisions, if desired, for admitting compressed air during a portion of the time through an orifice (not represented) near the top of the receptacle B. So, also, there may be provisions for introducing water near the top of the receptacle B, instead of, or in addition to, the stream being let in near the bottom. A single connection, G, may be employed, placed considerably higher than is here represented.

I have had much experience with this class of structures, and believe that a single connection introducing the water tangentially near the base of the receptacle B, as shown by G, will be found generally preferable.

I can use this apparatus, either in the exact form here shown or with obvious modifications, as an ash-ejector or a water-closet, or for discharging any matter (liquid or solid) from sailing-vessels, steam-vessels, or other structures from which it may be necessary to discharge the matter against a strong pressure from without.

I believe that the improvements here described render the apparatus perfectly secure, and very convenient and effective.

Although the influx of air from the connection E should be nearly or quite constant, the valve $e$ is useful in reducing the possibility of ashes or other matter flowing backward into the air-passage. This is especially important when under any circumstances the action of the air-pump is arrested.

I have spoken of the operating-handle $J'$ as if permanently attached to the screw J. It may, if preferred, be a simple wrench applied on a squared or otherwise suitably-formed end of the screw J.

The work below the neck A, or between it and the outside of the vessel, I have not represented. It may vary in different vessels, and must necessarily vary greatly in adapting the apparatus, respectively, to wood or iron vessels. It will offer no difficulty to mechanics familiar with the conditions required.

I claim as my improvement on my patent ejector of 1865 as follows:

1. The air-cock $i$, arranged in the cover of an ash-ejector to admit of the escape of air from the barrel B, and serve as a test of the tightness of the closing of the valve below, substantially as described.

2. The arrangement of lever or wrench J' and the handle $i'$ of the cock $i$ in the manner described, so that the wrench cannot be turned without opening the cock.

3. In combination with the ash-receptacle B, the tight-fitting cover I, suitable provisions for opening and closing the exit, and for introducing air under pressure to expel the contents, the water-connection G, with suitable controlling means, so arranged that the faces below may be washed clean of all matter that may prevent the proper shutting of the valve or valves, as herein specified.

In testimony whereof I have hereunto set my hand in the presence of two subscribing witnesses.

JOHN PALMER.

Witnesses:
WM. C. DEY,
ARNOLD HÖRMANN.